United States Patent
Fan et al.

(10) Patent No.: US 12,358,170 B2
(45) Date of Patent: Jul. 15, 2025

(54) METHOD AND APPARATUS FOR ROBOT COLLISION AVOIDANCE BY FULL SURFACE PROXIMITY DETECTION

(71) Applicant: SAMSUNG ELECTRONICS CO., LTD., Suwon-si (KR)

(72) Inventors: Xiaoran Fan, Secaucus, NJ (US); Riley William Simmons-Edler, Princeton, NJ (US); Daewon Lee, Princeton, NJ (US); Lawrence Jackel, Holmdel, NJ (US); Daniel Dongyuel Lee, Tenafly, NJ (US); Richard Howard, Highland Park, NJ (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 713 days.

(21) Appl. No.: 17/406,842

(22) Filed: Aug. 19, 2021

(65) Prior Publication Data

US 2022/0274269 A1 Sep. 1, 2022

Related U.S. Application Data

(60) Provisional application No. 63/155,126, filed on Mar. 1, 2021.

(51) Int. Cl.
*B25J 19/02* (2006.01)
*B25J 9/16* (2006.01)
(Continued)

(52) U.S. Cl.
CPC ........... *B25J 19/028* (2013.01); *B25J 9/1666* (2013.01); *B25J 13/086* (2013.01); *B25J 13/089* (2013.01); *G06N 3/04* (2013.01)

(58) Field of Classification Search
CPC ...... B25J 19/028; B25J 9/1666; B25J 13/086; B25J 13/089; B25J 19/026; G06N 3/04
(Continued)

(56) References Cited

U.S. PATENT DOCUMENTS 5,483,501 A    1/1996  Park et al.
5,515,341 A *  5/1996  Toda ................... B06B 1/0688
                                                      367/908
(Continued)

FOREIGN PATENT DOCUMENTS

CN    110954251 A    4/2020
JP    2005-161450 A  6/2005
(Continued)

OTHER PUBLICATIONS

Communication dated May 24, 2022 issued by the International Searching Authority in counterpart Application No. PCT/KR2022/002517 (PCT/ISA/220, PCT/ISA/210, and PCT/ISA/237).
(Continued)

*Primary Examiner* — Jaime Figueroa
(74) *Attorney, Agent, or Firm* — Sughrue Mion, PLLC

(57) ABSTRACT

An apparatus for collision avoidance by surface proximity detection includes a plurality of piezoelectric elements disposed adjacent to a surface of an object, a memory storing instructions, and at least one processor configured to execute the instructions to control a first one among the piezoelectric elements to generate an acoustic wave along the surface of the object, and receive, via a second one among the piezoelectric elements, an acoustic wave signal corresponding to the generated acoustic wave. The at least one processor is further configured to execute the instructions to filter the received acoustic wave signal, using a band-pass filter for reducing noise of the received acoustic wave signal, obtain a proximity signal for proximity detection, from the filtered
(Continued)

acoustic wave signal, using a linear time-invariant filter, and detect whether an obstacle is proximate to the surface of the object by inputting the obtained proximity signal into a neural network.

20 Claims, 13 Drawing Sheets

(51) Int. Cl.
  *B25J 13/08* (2006.01)
  *G06N 3/04* (2023.01)
(58) Field of Classification Search
  USPC .............. 700/245–264; 318/568.11–568.25
  See application file for complete search history.

(56) References Cited

U.S. PATENT DOCUMENTS

| | | | |
|---|---|---|---|
| 8,742,645 B2 | 6/2014 | Lee et al. | |
| 8,994,248 B2* | 3/2015 | Lee ..................... | G01S 15/04 |
| | | | 310/322 |
| 10,031,111 B2* | 7/2018 | Clark ..................... | B24C 1/045 |
| 10,416,629 B1 | 9/2019 | Bingham et al. | |
| 10,789,824 B1* | 9/2020 | Cheng ............... | G05B 19/41805 |
| 10,795,342 B1* | 10/2020 | Cai ..................... | B25J 9/1676 |
| 2003/0133362 A1 | 7/2003 | Fortuna et al. | |
| 2009/0059726 A1* | 3/2009 | Okuda ................. | G01S 15/931 |
| | | | 310/334 |
| 2009/0168603 A1* | 7/2009 | Okuda ................. | G01S 15/931 |
| | | | 367/87 |
| 2012/0147708 A1* | 6/2012 | Lee ..................... | G01S 15/04 |
| | | | 367/180 |
| 2015/0016225 A1* | 1/2015 | Steckel .................. | G01S 7/526 |
| | | | 367/99 |
| 2018/0250824 A1* | 9/2018 | Hannya .................. | B25J 9/1676 |
| 2020/0001460 A1* | 1/2020 | Sato ...................... | B25J 9/1676 |
| 2020/0210726 A1 | 7/2020 | Yang et al. | |
| 2020/0302949 A1* | 9/2020 | Jeong .................... | G06N 3/045 |
| 2020/0367977 A1 | 11/2020 | Liu et al. | |
| 2022/0036245 A1* | 2/2022 | Muller ................... | G06N 3/065 |

FOREIGN PATENT DOCUMENTS

| | | |
|---|---|---|
| JP | 2010-128543 A | 6/2010 |
| JP | 4511216 B2 | 7/2010 |
| KR | 10-2012-0063743 A | 6/2012 |
| KR | 10-1655302 B1 | 9/2016 |
| KR | 102177711 B1 | 11/2020 |

OTHER PUBLICATIONS

Cho, Il-Joo et al., "Compliant Ultrasound Proximity Sensor for the Safe Operation of Human Friendly Robots Integrated with Tactile Sensing Capability", Journal of Electrical Engineering and Technology, 2017, vol. 12, No. 1, pp. 310-316. (7 pages total).

Geiger, Martin et al., "160-GHz Radar Proximity Sensor With Distributed and Flexible Antennas for Collaborative Robots", IEEE Access, Feb. 8, 2019, vol. 7, pp. 14977-14984. (8 pages total).

Benet, G. et al., "Using infrared sensors for distance measurement in mobile robots", Robotics and Autonomous Systems, vol. 1006, 2002, pp. 1-12.

Amzajerdian, Farzin et al., "Imaging Flash Lidar for Autonomous Safe Landing and Spacecraft Proximity Operation", in AIAA SPACE 2016, 2016. (12 pages total).

Hashimoto, Ken-Ya, "Surface Acoustic Wave Devices in Telecommunications", . Springer, 2000. (9 pages total).

Alvarez, H. et al., "Collision Avoidance for Quadrotors with a Monocular Camera", Experimental Robotics, Springer, 2016, pp. 1-14.

Chen, Gang et al., "Bio-inspired Obstacle Avoidance for Flying Robots with Active Sensing", arXiv:2010.04977v1 [cs.RO], Oct. 10, 2020. (8 pages total).

Schmidt, Bernard et al., "Depth camera based collision avoidance via active robot control", Journal of Manufacturing Systems, 2014. (8 pages total).

Fan, Xiaoran et al., "Towards Flexible Wireless Charging for Medical Implants Using Distributed Antenna System", MobiCom 20, Sep. 21-25, 2020, ACM MOBICOM, 2020. (15 pages total).

Poeppel, Alexander et al., "Robust Distance Estimation of Capacitive Proximity Sensors in HRI using Neural Networks", 2020 Fourth IEEE International Conference on Robotic Computing (IRC), pp. 344-351.

"Kinova Jaco Prosthetic robotic arm," KINOVA, Webpage, 2018, https://www.kinovarobotics.com/sites/default/files/PS-PRA-JAC-UG-INT-EN%20201804-1.0%20%28KINOVA%20JACO%E2%84%A2%20Prosthetic%20robotic%20arm%20user%20guide%29_0.pdf. (13 pages total).

"VNA-UHF—Two Port Vector Network Analyzer, 5 kHz to 1200 MHz", Array Solutions, Webpage, 2021, https://www.arraysolutions.com/vna-uhf. (3 pages total).

"Noico 80 mil Sound Deadner", Noico Solutions, Webpage, 2020, https://noico.info/products/noico-80-mil-10-sqft-car-sound-deadening-mat/. (3 pages total).

Erceg, Vinko et al., "An Empirically Based Path Loss Model for Wireless Channels in Suburban Environments", IEEE Journal on Selected Areas in Communications, vol. 17, No. 7, Jul. 1999, pp. 1205-1211. (7 pages total).

Fan, Xiaoran et al., "Acoustic Collision Detection and Localization for Robot Manipulators", 2020 IEEE/RSJ International Conference on Intelligent Robots and Systems (IROS), Oct. 25-29, 2020, pp. 9529-9536. (8 pages total).

Granjon, Pierre, "The CuSum algorithm—a small review", HAL Open Science, Mar. 13, 2014. (23 pages total).

"CPT-2065-L100 Piezo Element," CUDEVICES, Webpage, 2021, https://www.cuidevices.com/product/resource/cpt-2065-1100.pdf. (4 pages total).

"SMSL M100 USB DAC", Webpage, 2021, https://www.amazon.com/AK4452-DSD512-Coaxial-Optical-Decoder/dp/B0868PW3YZ. (8 pages total).

"Massdrop X Alex Cavalli Liquid Carbon X Amp", Webpage, https://drop.com/buy/massdrop-x-alex-cavalli-liquid-carbon-x-amp, 2021. (9 pages total).

"Zoom F8n MultiTrack Field Recorder", ZOOMCORP, Webpage, https://zoomcorp.com/en/us/field-recorders/field-recorders/f8n/, 2015. (34 pages total).

"Intel NUC7i7BNH", Webpage, https://ark.intel.com/content/www/us/en/ark/products/95065/intel-nuc-kit-nuc7i7bnh.html, 2019. (4 pages total).

Paszke, Adam et al., "PyTorch: An Imperative Style, High-Performance Deep Learning Library", 33rd Conference on Neural Information Processing Systems (NeurIPS 2019). (12 pages totals).

Kingma, Diederik P., "ADAM: A Method for Stochastic Optimization", Published as a conference paper at ICLR 2015, arXiv:1412.6980v9 [cs.LG], Jan. 30, 2017. (15 pages total).

Ioffe, Sergey et al., "Batch Normalization: Accelerating Deep Network Training by Reducing Internal Covariate Shift", Proceedings of the 32nd International Conference on Machine Learning, Lille, France, 2015, JMLR: W&CP, vol. 37. (9 pages total).

Fan, Xiaoran et al., "AuraSense: Robot Collision Avoidance by Full Surface Proximity Detection", arXiv:2108.04867v1 [cs.RO], Aug. 10, 2021. (8 pages total).

Kohji Toda et al., "Ultrasonic imaging system using a leaky surface acoustic wave transducer composed of piezoelectric ceramic and fused quartz", Journal of Applied Physics, vol. 69, No. 1, Jan. 1, 1991, pp. 103-108, DOI: 10.1063/1.347745, XP000208195.

Communication issued on Feb. 22, 2024 by the European Patent Office for European Patent Application No. 22763516.6.

Communication dated May 21, 2025 issued by the European Patent Office in European Patent Application No. 22763516.6.

\* cited by examiner

METHOD AND APPARATUS FOR ROBOT COLLISION AVOIDANCE BY FULL SURFACE PROXIMITY DETECTION

CROSS-REFERENCE TO RELATED APPLICATION

This application is based on and claims priority under 35 U.S.C. § 119 from U.S. Provisional Application No. 63/155,126 filed on Mar. 1, 2021, in the U.S. Patent & Trademark Office, the disclosure of which is incorporated by reference herein in its entirety.

BACKGROUND

1. Field

The disclosure relates to a method and an apparatus for robot collision avoidance by full surface proximity detection.

2. Description of Related Art

As robots work in dynamic environments, unexpected collisions with people and obstacles must be avoided. A robot colliding with the environment can damage itself or its surroundings, and can harm humans in the workspace. Collision avoidance systems enable the robot to detect approaching obstacles before collision, and take measures to avoid or mitigate impact. Such systems may be particularly necessary for robotic manipulators such as robot arms to safely operate in uncertain and dynamic environments. As such, there has been extensive research on collision avoidance systems for robotic manipulators.

Unlike collision avoidance systems for automobiles, robot manipulators may usually operate in confined spaces, where collision avoidance depends on accurate short-range sensing in cluttered environments. Many existing collision avoidance methods use cameras and computer vision-based object recognition or three-dimensional (3D) shape reconstruction to detect and react to obstacles. However, these approaches have several limitations. Their performance suffers when faced with obstacle occlusions, poor light conditions, and transparent or mirrored objects that are hard to detect visually. Further, camera-based approaches are typically not accurate over very short ranges (less than 10 cm) depending on camera focal length, and any single camera has a limited field of view.

To address this need for short-range detection, proximity sensors such as ultrasonic proximity sensors, millimeter wave radar, infrared proximity sensors, and short-range light detecting and ranging (LiDAR) have been proposed for robot collision avoidance. These methods also have limitations. LiDAR and millimeter wave radar are expensive, and all these methods are all highly directional. Effective coverage may require multiple sensors distributed throughout the robot, and blind spots can be difficult to eliminate entirely without vast numbers of sensors. This complicates robotic system design and adds a significant amount of extra cost and sensor management overhead.

SUMMARY

In accordance with an aspect of the disclosure, there is provided an apparatus for collision avoidance by surface proximity detection, the apparatus including a plurality of piezoelectric elements disposed adjacent to a surface of an object, a memory storing instructions, and at least one processor configured to execute the instructions to control a first one among the piezoelectric elements to generate an acoustic wave along the surface of the object, and receive, via a second one among the piezoelectric elements, an acoustic wave signal corresponding to the generated acoustic wave. The at least one processor is further configured to execute the instructions to filter the received acoustic wave signal, using a band-pass filter for reducing noise of the received acoustic wave signal, obtain a proximity signal for proximity detection, from the filtered acoustic wave signal, using a linear time-invariant filter, and detect whether an obstacle is proximate to the surface of the object by inputting the obtained proximity signal into a neural network.

In accordance with an aspect of the disclosure, there is provided a method of collision avoidance by surface proximity detection, the method being performed by at least one processor, and the method including controlling a first one among piezoelectric elements disposed adjacent to a surface of an object, to generate an acoustic wave along the surface of the object, and receiving, via a second one among the piezoelectric elements, an acoustic wave signal corresponding to the generated acoustic wave. The method further includes filtering the received acoustic wave signal, using a band-pass filter for reducing noise of the received acoustic wave signal, obtaining a proximity signal for proximity detection, from the filtered acoustic wave signal, using a linear time-invariant filter, and detecting whether an obstacle is proximate to the surface of the object by inputting the obtained proximity signal into a neural network.

In accordance with an aspect of the disclosure, there is provided a non-transitory computer-readable storage medium storing instructions that, when executed by at least one processor, cause the at least one processor to control a first one among piezoelectric elements disposed adjacent to a surface of an object, to generate an acoustic wave along the surface of the object, and receive, via a second one among the piezoelectric elements, an acoustic wave signal corresponding to the generated acoustic wave. The instructions, when executed by the at least one processor, further cause the at least one processor to filter the received acoustic wave signal, using a band-pass filter for reducing noise of the received acoustic wave signal, obtain a proximity signal for proximity detection, from the filtered acoustic wave signal, using a linear time-invariant filter, and detect whether an obstacle is proximate to the surface of the object by inputting the obtained proximity signal into a neural network.

BRIEF DESCRIPTION OF THE DRAWINGS

The above and other aspects, features, and advantages of embodiments of the disclosure will be more apparent from the following description taken in conjunction with the accompanying drawings, in which.

DETAILED DESCRIPTION

Figure 1A:
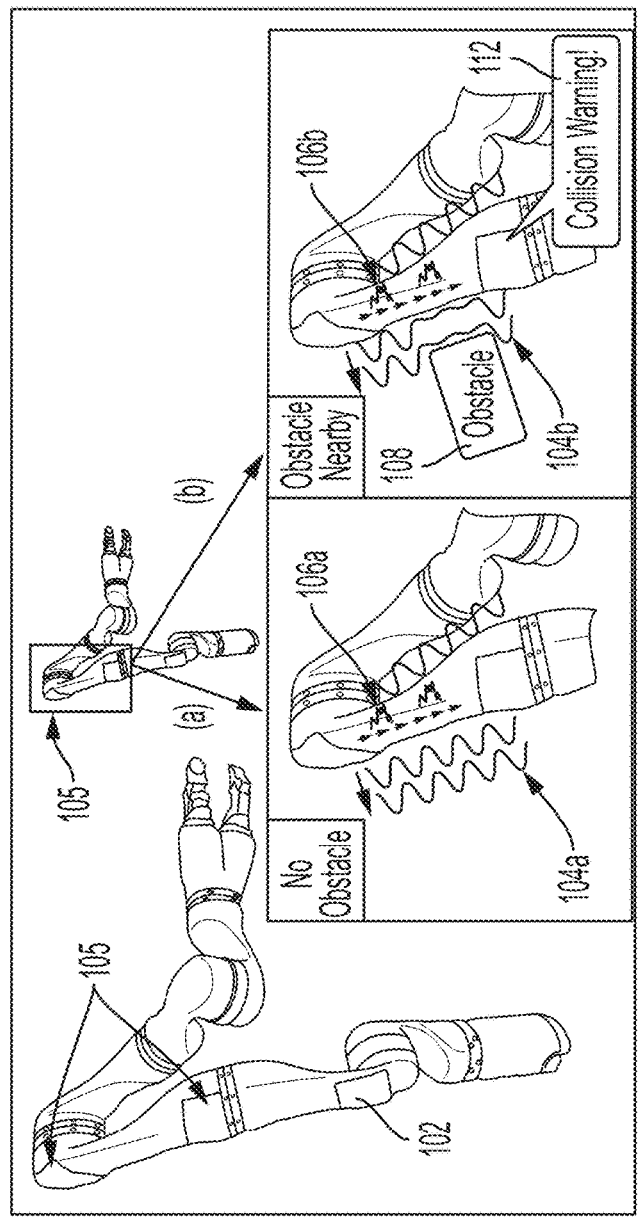
FIG. 1A is a diagram illustrating an apparatus for robot collision avoidance by full surface proximity detection, according to embodiments.

Embodiments described herein provide a sensing modality, which will be referred to as a LSW, enabling no-dead-spot short-range proximity detection for robot arms. A proximity detection system using this principle is lightweight, is cheap, can be attached to an off-the-shelf robotic manipulator with minimal modifications, and provides proximity detection of all objects with sufficient cross-sectional area across an entire surface of a robot. The system can perform full surface and omnidirectional on-robot proximity detection on a linkage using only a single sensor pair.

In detail, the embodiments described herein use a pair of piezoelectric elements attached to a robot arm, and one of the piezoelectric elements transmits excitation signals through the robot arm to another of the piezoelectric elements. This acoustic energy transfers through a whole surface of the robot arm, which couples with surrounding air and leaks an acoustic signal. This leaky signal decays in the air, forming an "aura" surrounding the robot surface. An approaching obstacle that enters this aura will establish a standing wave pattern between the obstacle and the robot surface, changing an acoustic impedance of a system. This change can be measured by another piezoelectric element attached to the arm at a point far from the obstacle, allowing the system to perform proximity detection. The system according to one or more embodiments of the present application may be implemented using other sound producers, such as speakers and microphones without using the piezoelectric elements.

To realize the above, a number of technical and implementation challenges need to be addressed. First, a major component of a signal is received from a surface of a robot rather than a leaky over-the-air signal. However, only the leaky over-the-air signal may contain information useful for proximity detection. An embodiment employs a set of hardware tweaks and signal processing techniques to extract this minor leaky signal from the large surface signal.

Second, a robot arm itself introduces both mechanical and electrical noise that can be received by an attached piezoelectric element. An embodiment solves this issue by customizing a waveform, and further digitally filtering the noise.

Third, a received signal may vary non-linearly depending on a robot pose and relative obstacle position/velocity as a robot moves around. Further, a robot arm could detect itself as an "obstacle" as linkages move closer to each other, and a surface wave propagating channel changes drastically. To resolve these issues, an embodiment uses a lightweight one-dimensional convolutional neural network (1DCNN) to identify whether a given received audio sequence corresponds to a presence of a non-self-obstacle.

An implementation presents an end-to-end proximity detection system with a pair of low cost piezoelectric elements attached to a robot arm, and demonstrating no-dead-spot proximity sensing. The design may be embedded into a robot with minimum modifications.

Figure 1B:
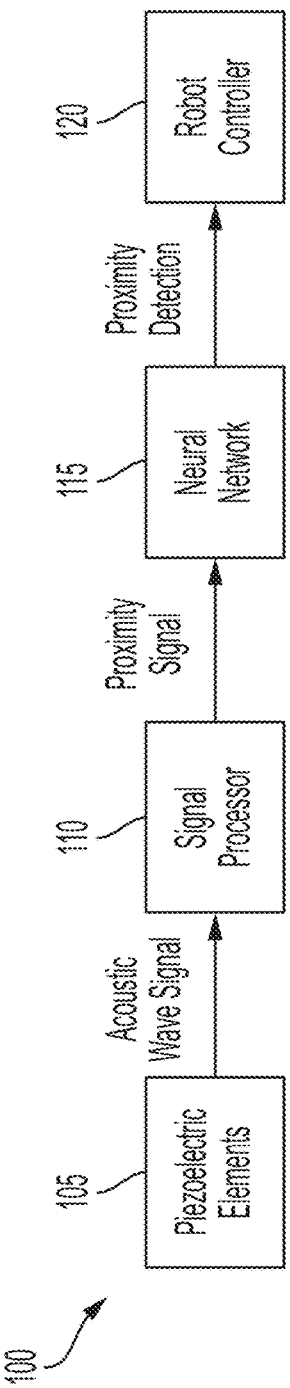
FIG. 1B is a block diagram illustrating the apparatus of FIG. 1A.

FIG. 1A is a diagram illustrating an apparatus 100 for robot collision avoidance by full surface proximity detection, according to embodiments. FIG. 1B is a block diagram illustrating the apparatus 100 of FIG. 1A.

The apparatus 100 and any portion of the apparatus 100 may be included or implemented in a robot and/or an electronic device. The electronic device may include any type of electronic device, for example, a smartphone, a laptop computer, a personal computer (PC), a smart television and the like.

As shown in FIGS. 1A and 1B, the apparatus 100 includes piezoelectric elements 105, a signal processor 110, a neural network 115 and a robot controller 120.

The piezoelectric elements 105 are disposed adjacent to a surface 102 of an object, e.g., the robot and/or the electronic device. For example, the piezoelectric elements 105 may be coupled to, disposed on, or embedded within the surface 102 of a robot arm.

At least one processor of the apparatus 100 controls a first one among the piezoelectric elements 105 to generate an acoustic wave 104a within and along the surface 102 of the object. The acoustic wave 104a may be referred to as the LSW, as it may leak from or surround the surface 102 of the object. The at least one processor may apply an excitation signal to the first one among the piezoelectric elements 105 to control the first one among the piezoelectric elements 105 to generate the acoustic wave 104a.

If the object is made out of elastic materials, such as plastic or metal, the surface 102 of the object will vibrate and couple with the air, and the entire surface 102 of the object functions as an acoustic transducer. Notably, the source piezoelectric element 105 couples with the object's surface 102 instead of air, and could even be embedded within the object.

The signal processor 110 receives, via a second one among the piezoelectric elements 105, an acoustic wave signal 106a corresponding to the generated acoustic wave 104a.

Based on an obstacle 108 being nearby the apparatus 100, the generated acoustic wave 104a becomes a deformed acoustic wave 104b within and along the surface 102 of the object. The signal processor 110 receives, via the second one among the piezoelectric elements 105, a deformed acoustic wave signal 106b corresponding to the deformed acoustic wave 104b.

The signal processor 110 filters the received acoustic wave signal 106a or the received deformed acoustic wave signal 106b, using a band-pass filter for reducing noise of the received acoustic wave signal 106a or the received deformed acoustic wave signal 106b. Further, the signal processor 110 obtains a proximity signal for proximity detection, from the filtered acoustic wave signal, using a linear time-invariant filter.

The neural network 115 detects whether the obstacle 108 is proximate to the surface 102 of the object by inputting the obtained proximity signal into the neural network 115.

Based on the object being the robot, and based on the obstacle 108 being detected to be proximate to the surface 102 of the object, the robot controller 120 controls the object to avoid collision with the obstacle 108. For example, the robot controller 120 may control the robot to output a collision warning 112, which may be an audible sound.

Figure 2:
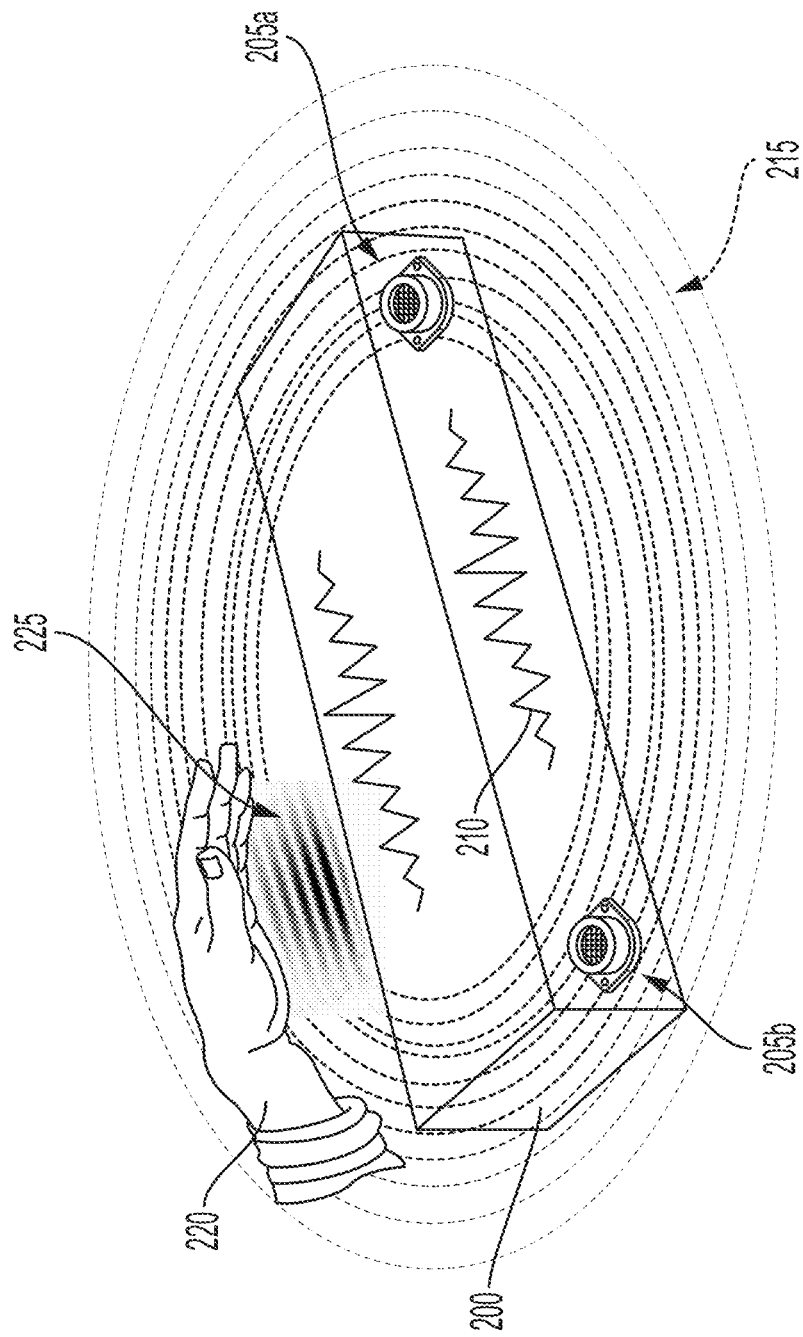
FIG. 2 is a diagram illustrating a leaky surface wave (LSW) effect, according to embodiments.

FIG. 2 is a diagram illustrating a LSW effect, according to embodiments.

A schematic illustrating how the LSW can be distorted is shown in FIG. 2. While most of an acoustic wave 210 generated by a piezoelectric transmitter 205a stays on a surface of an object 200, a small amount "leaks" into air as a LSW 215. This LSW 215 decays exponentially in the air, resulting in an acoustic "aura" around the surface of the object 200. This "aura" is an acoustic pressure field surrounding the object 200.

An obstacle 220 close to the surface of the object 200 will establish a standing wave pattern 225 or interference pattern between the obstacle 220 and the object surface, which perturbs the acoustic pressure field and results in an acoustic impedance change across the entire surface. These changes can be detected by a piezoelectric receiver 205b elsewhere on or within the object 200. As the acoustic wave 210 propagates through the object 200, obstacles close to any point on the object surface will cause distortions that can be measured at other points on or within the object 200, allowing for a single transmitter/receiver pair of piezoelectric elements to detect the obstacles close to any part of the coupled object 200.

This surface acoustic pressure field distortion displays a number of useful properties.

Figure 3A:
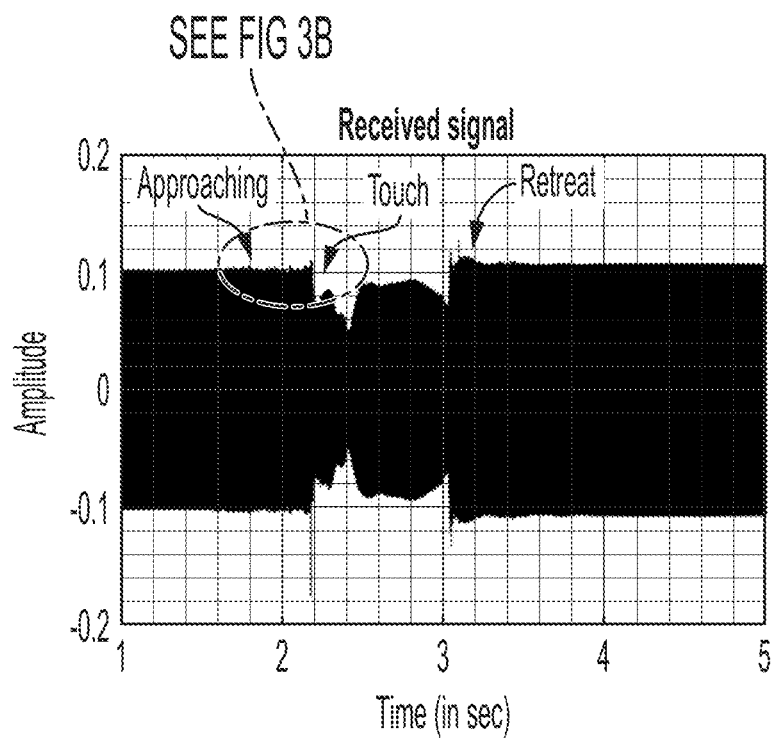
FIG. 3A shows a graph illustrating a received signal due to an obstacle approaching, touching and retreating from an object including the apparatus of FIGS. 1A and 1B.
Figure 3B:
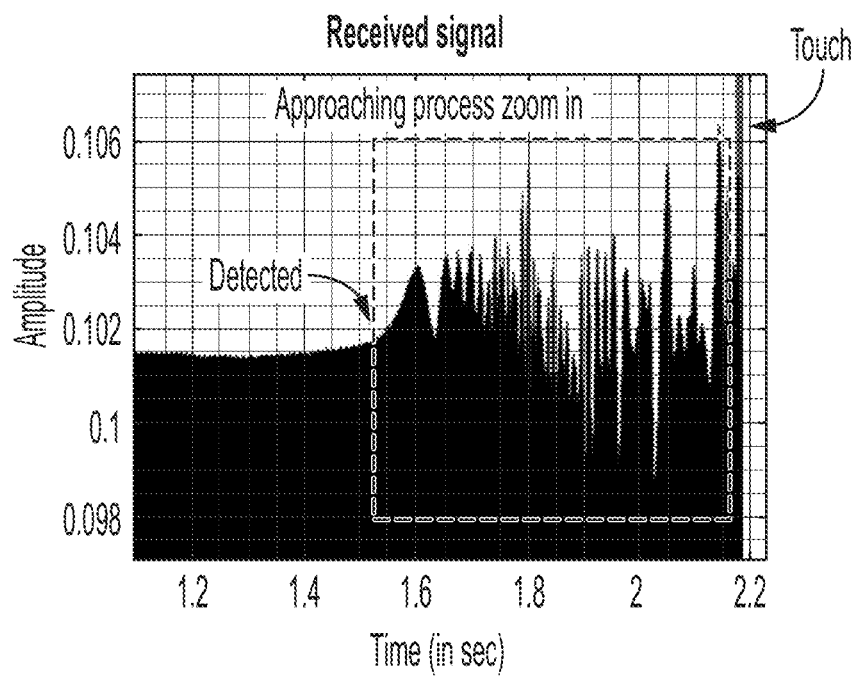
FIG. 3B shows a graph illustrating a zoom in view of the received signal due to the obstacle approaching the object that is illustrated in the graph of FIG. 3A.

FIG. 3A shows a graph illustrating a received signal due to an obstacle approaching, touching and retreating from an object including the apparatus 100 of FIGS. 1A and 1B. FIG. 3B shows a graph illustrating a zoom in view of the received signal due to the obstacle approaching the object that is illustrated in the graph of FIG. 3A.

As described with respect to FIGS. 1A-2, an obstacle (e.g., a person's hand) may approach an object (e.g., a pipe or robot arm), touch it, and then retreat or retreat.

FIG. 3A shows an acoustic wave signal that is received by a piezoelectric element. Touching the object (at 2.2-3 seconds) introduces a major signal perturbation.

Looking closely at a period in which the obstacle is approaching the object, shown in more detail in the graph of FIG. 3B, an approach of the obstacle (at 1.5-2.2 seconds) can be clearly observed as well. Peaks and dips reflect a standing wave pattern between the obstacle and a surface of the object, which has a peak-to-peak distance of $d=\lambda/2$, $\lambda$ being a wavelength of the acoustic wave signal. An amplitude of a distortion increases as the obstacle gets closer to the object. This signal pattern varies depending on a nature of the approaching obstacle, an obstacle's position and velocity relative to the object, and an obstacle's distance from the surface.

Figure 4A:
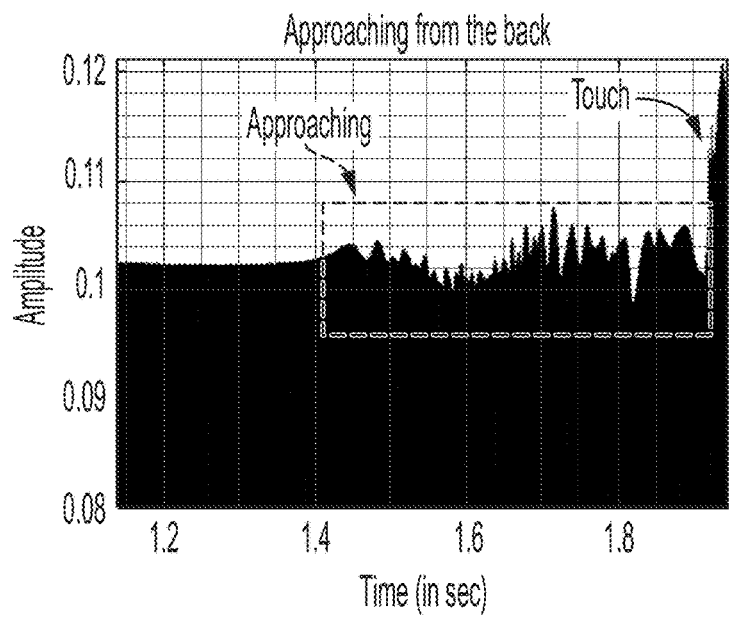
FIG. 4A is a graph illustrating a received signal due to an obstacle approaching a back of piezoelectric elements of an object including the apparatus of FIGS. 1A and 1B.
Figure 4B:
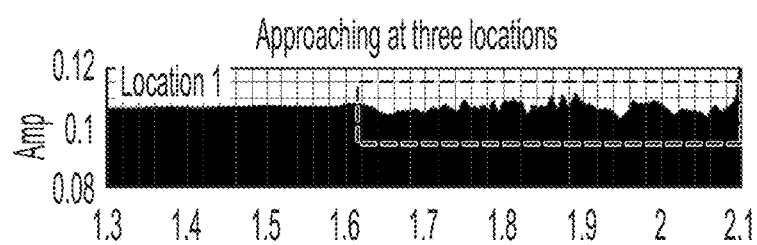
FIGS. 4B-4D are graphs illustrating a received signal due to an obstacle approaching three different locations of an object including the apparatus of FIGS. 1A and 1B.
Figure 4C:
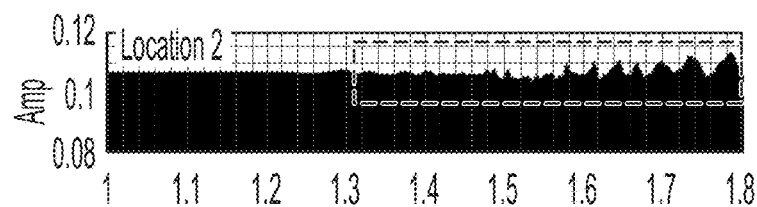
Figure 4D:
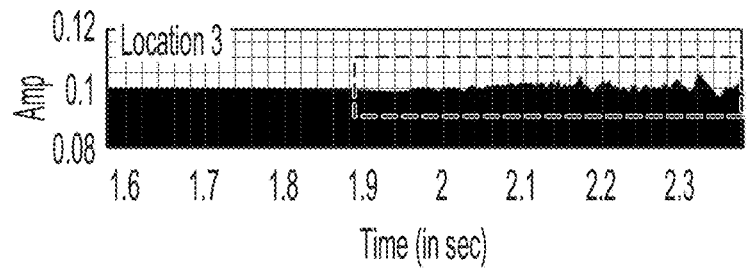

FIG. 4A is a graph illustrating a received signal due to an obstacle approaching a back of piezoelectric elements of an object including the apparatus 100 of FIGS. 1A and 1B. FIGS. 4B-4D are graphs illustrating a received signal due to an obstacle approaching three different locations of an object including the apparatus 100 of FIGS. 1A and 1B.

FIGS. 4A-4D show that an LSW can enable whole surface proximity detection.

As shown in FIG. 4A, when piezoelectric elements are disposed on a front side of an object, an acoustic wave signal pattern is clearly visible even if an obstacle (e.g., a hand) approaches from a back side of the object.

FIGS. 4B-4D demonstrate received acoustic signals when an obstacle (e.g., a hand) approaches at three random locations on an object. The acoustic wave signal pattern again can be observed.

Figure 5A:
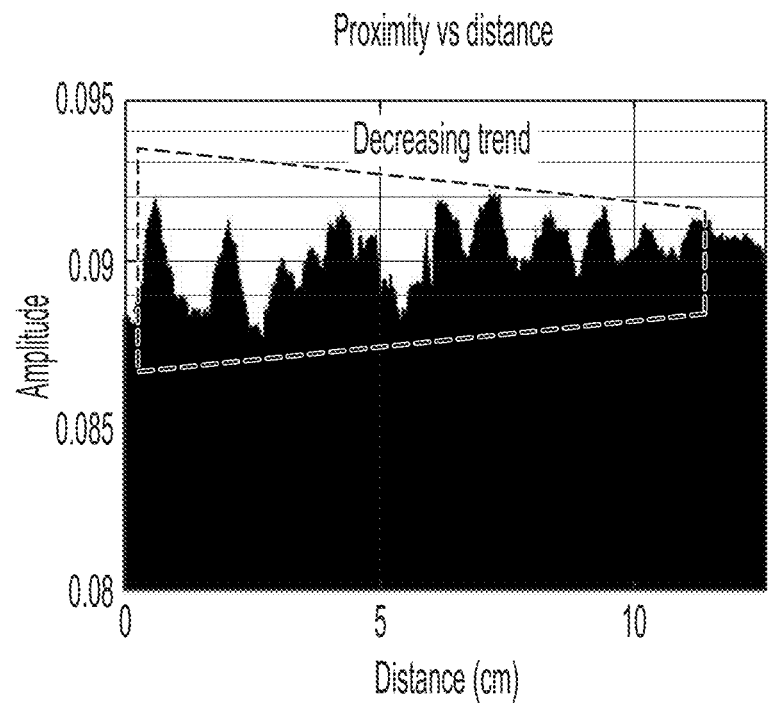
FIG. 5A is a graph illustrating a received signal at different distances between an obstacle and an object including the apparatus of FIGS. 1A and 1B, when a piezoelectric transmitter is attached on the object.
Figure 5B:
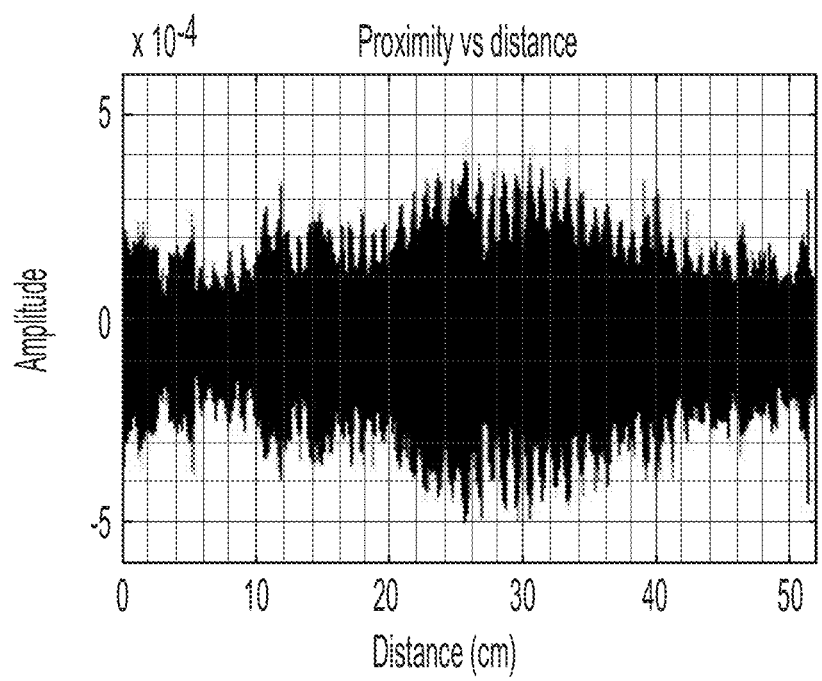
FIG. 5B is a graph illustrating a received signal at different distances between an obstacle and an object including the apparatus of FIGS. 1A and 1B, when a piezoelectric transmitter is placed above the object.

FIG. 5A is a graph illustrating a received signal at different distances between an obstacle and an object including the apparatus 100 of FIGS. 1A and 1B, when a piezoelectric transmitter is attached on the object. FIG. 5B is a graph illustrating a received signal at different distances between an obstacle and an object including the apparatus 100 of FIGS. 1A and 1B, when a piezoelectric transmitter is placed above the object.

FIGS. 5A and 5B show how an acoustic wave signal changes at different distances to a surface of an object.

As can be seen from FIG. 5A, the acoustic wave signal is strong only when the obstacle (e.g., a rod) is less than 10 cm from the object, and there is a decreasing trend for the acoustic wave signal. Also, a spacing between peaks is roughly 0.85 cm, which is around half a wavelength ($\lambda/2=0.85$ cm at 20 kHz). It means a pattern of the acoustic wave signal is a function of a distance between the obstacle and a vibrating surface of the object.

On the other hand, when a piezoelectric transmitter is detached from a surface of an object (hanging about 1 cm above the surface), as shown in FIG. 5B, a decreasing signal pattern does not exist, and it becomes rather random. Also, an amplitude of the received signal is around 60 times smaller because a piezoelectric receiver now can no longer receive the signal coming from the surface.

The experiment according to FIGS. 5A and 5B shows that the LSW propagates along the surface of the object (e.g., a robot) having the piezoelectric transmitter mounted thereon, instead of propagating over the air path, since a signal pattern does not exist over the air path when the piezoelectric transmitter is detached 1 cm above the surface.

Compared to other sensing modalities, such as ultrasonic ranging, capacitive sensing, or video-based detection, LSW sensing may have no blind spots, require minimal modifications to a target object (transducers are small and can be easily and non-permanently attached to a surface), require no expensive components, operate at low power, and respond well to objects without specific dielectric constants only at close range.

Figure 6A:
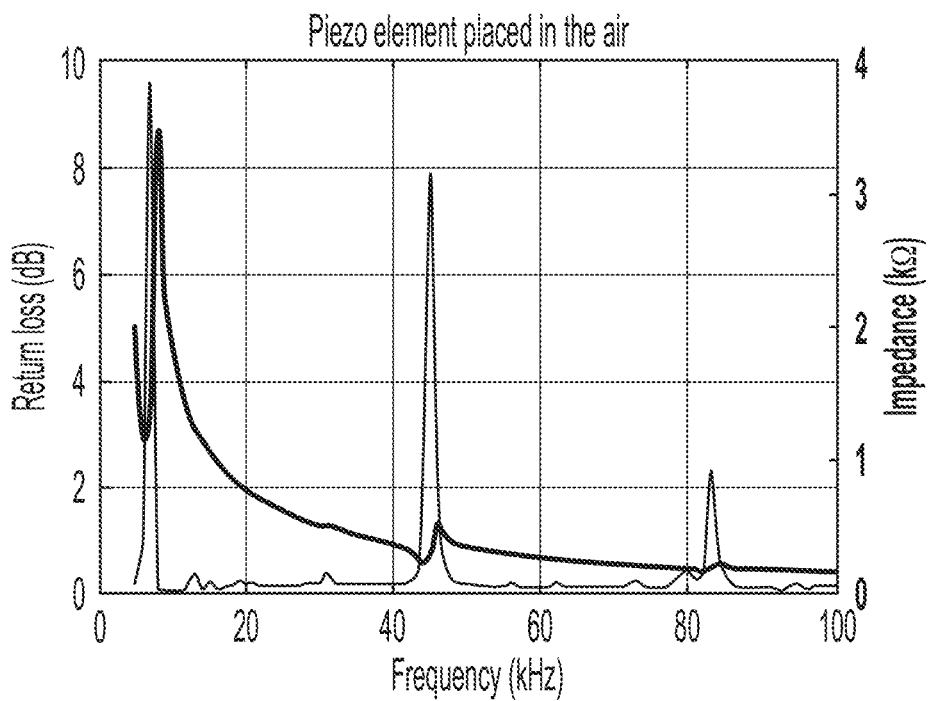
FIG. 6A is a graph illustrating a return loss and an impedance of a piezoelectric element included in the apparatus of FIGS. 1A and 1B, when the piezoelectric element is placed in air.
Figure 6B:
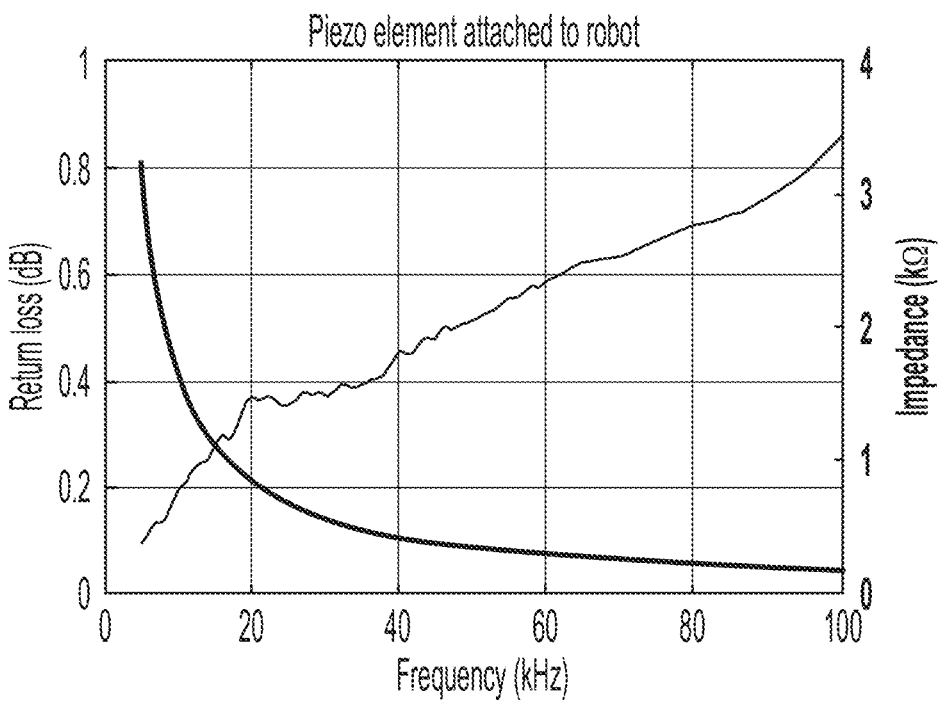
FIG. 6B is a graph illustrating a return loss and an impedance of a piezoelectric element included in the apparatus of FIGS. 1A and 1B, when the piezoelectric element is attached to an object.
Figure 7A:
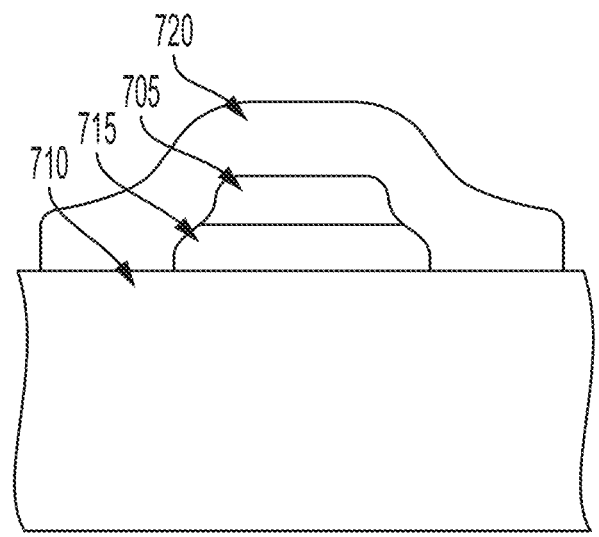
FIG. 7A is a cross-sectional view illustrating a piezoelectric element disposed on an object including an apparatus for robot collision avoidance by full surface proximity detection, according to embodiments.
Figure 7B:
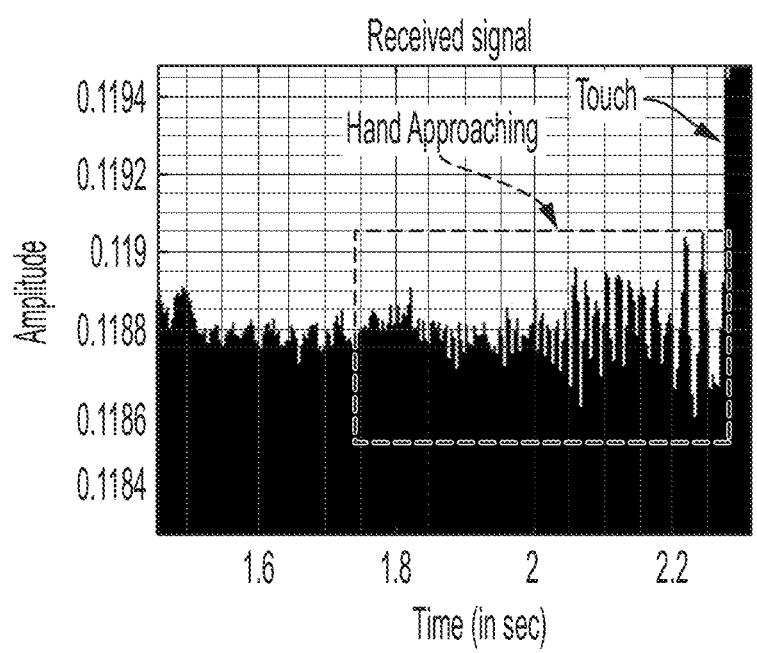
FIG. 7B is a graph illustrating a received signal due to an obstacle approaching and touching the object shown in FIG. 7A.

FIG. 6A is a graph illustrating a return loss and an impedance of a piezoelectric element included in the apparatus 100 of FIGS. 1A and 1B, when the piezoelectric element is placed in air. FIG. 6B is a graph illustrating a return loss and an impedance of a piezoelectric element included in the apparatus 100 of FIGS. 1A and 1B, when the piezoelectric element is attached to an object. FIG. 7A is a cross-sectional view illustrating a piezoelectric element 705 disposed on an object 710 including an apparatus for robot collision avoidance by full surface proximity detection, according to embodiments. FIG. 7B is a graph illustrating a received signal due to an obstacle approaching and touching the object shown in FIG. 7A.

In an example, the apparatus 100 is implemented in a carbon fiber composite based manipulator of a robot. To obtain an LSW working on the robot, piezoelectric elements are coupled with a robot surface. Piezoelectric elements are usually designed to couple with air. It can be seen from FIG. 6A, a piezoelectric element resonates at 7 kHz, 45 kHz, and 83 kHz, at which most of energy goes into the air.

Referring to FIG. 7A, the piezoelectric element 705 is disposed on the object 710 (e.g., a robot arm). A glue 715 is interposed between the piezoelectric element 705 and the object 710 to better couple the piezoelectric element 705 to the object 710. A sound deadener 720 is disposed on a surface of the object 710 and a surface of the piezoelectric element 705. To decouple the piezoelectric element 705 with air, the hot glue 715 glues the piezoelectric element 705 onto the surface of the object 710, and the sound deadener 720 (e.g., Noico solutions 80 Mil) seals the piezoelectric element 705.

FIG. 6B shows that resonances that pump acoustic energy into air are removed, and an impedance indicates that a piezoelectric element becomes almost purely capacitive after attached on a robot. As a result, FIG. 7B shows that an LSW can successfully be launched on the robot to collect an acoustic wave or received signal.

In an example, an LSW is transmitted by one of a plurality of piezoelectric elements. It passes through a robot surface and is received by another one of the piezoelectric elements. A robot arm works as a wireless channel in this system. Denoting a transmitted signal as s(t) and a wireless channel as h, a received signal r(t) can be represented as:

$$r(t)=hs(t)+n \quad (1),$$

where n is internal and external system noise. A high level idea is to detect if there is an approaching object from the received signal r(t) under the time varying channel response h and the noise n.

Figure 8A:
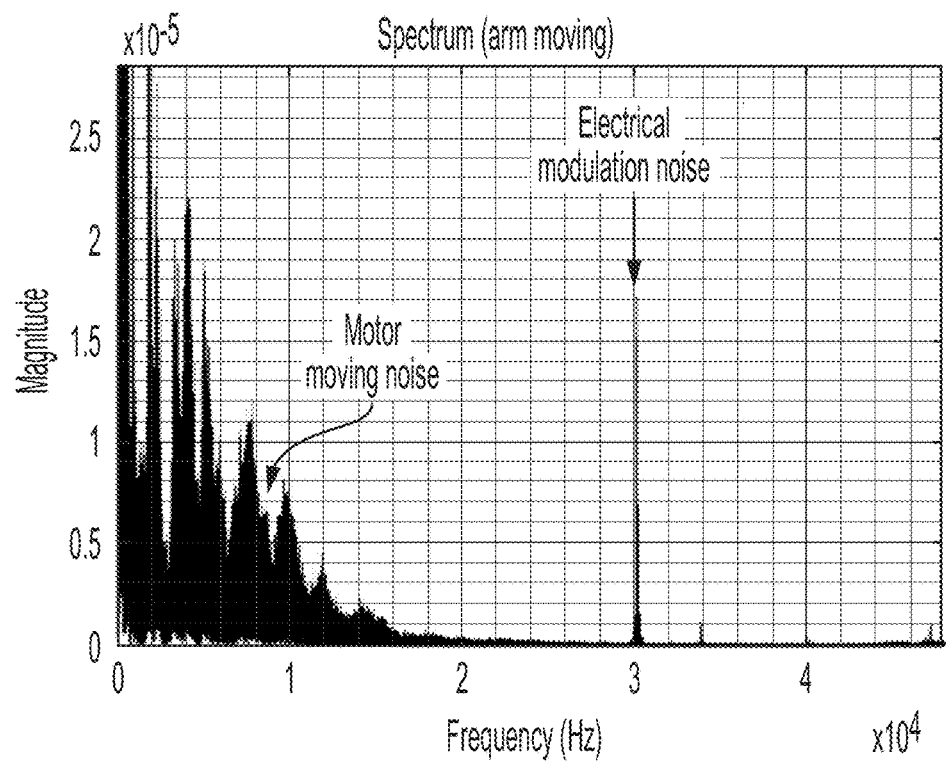
FIG. 8A is a graph illustrating a noise spectrum when an object is moving.
Figure 8B:
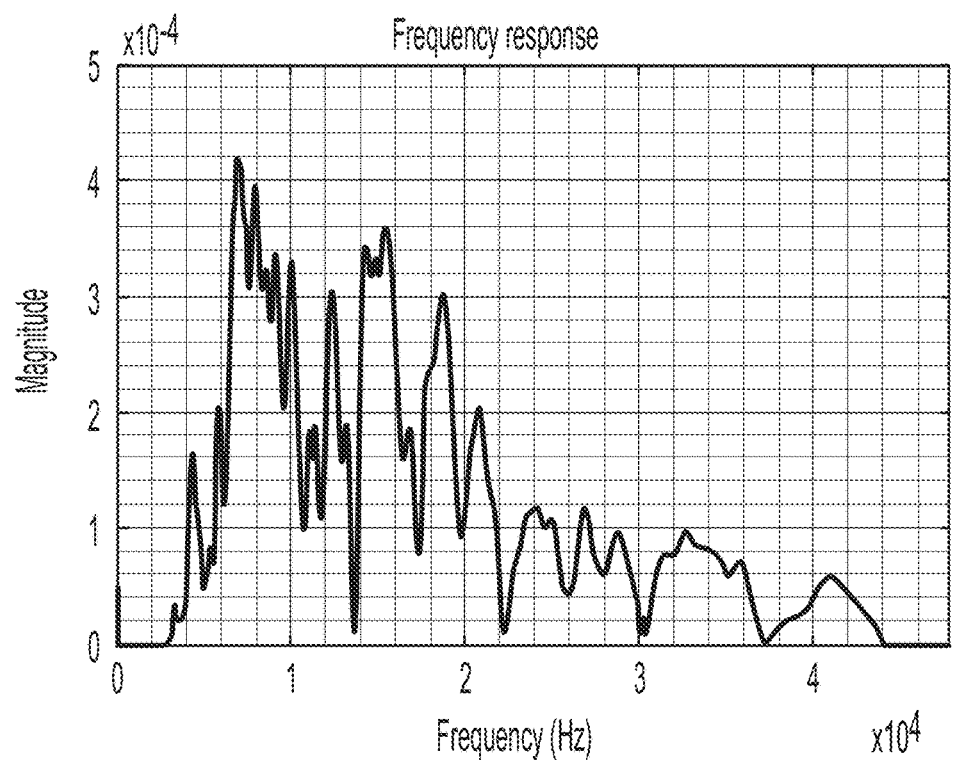
FIG. 8B is a graph illustrating a frequency response that is measured by a piezoelectric receiver included in an apparatus for robot collision avoidance by full surface proximity detection, according to embodiments.

FIG. 8A is a graph illustrating a noise spectrum when an object is moving. FIG. 8B is a graph illustrating a frequency response that is measured by a piezoelectric receiver included in an apparatus for robot collision avoidance by full surface proximity detection, according to embodiments.

A next immediate challenge is to address noises n that come from an object (e.g., a robot arm). There are two types of noises: (1) electrical noise coming from a power supply modulated with motors that exists for both moving and stationary arms; and (2) mechanical noise coming from the motors and gears operating when the arm is moving.

FIG. 8A shows a spectrum of measured noise from a robot. The noise spectrum is calculated from a signal that records a robot arm randomly moving for 10 minutes, while no excitation signal is applied on a piezoelectric element. A majority of a mechanical noise energy resides below a 15 kHz range, and there are also significant electrical noise spikes at 30 kHz.

After understanding robot noise characteristics, a range of useful frequencies can be chosen that do not overlap with a noise spectrum. On another hand, due to a nonhomogeneous nature of a robot arm, an LSW responds differently across different frequency bins. FIG. 8B shows a frequency response measured by a piezoelectric receiver. In this example, a piezoelectric transmitter launches a linear chirp signal that sweeps from 0-48 kHz, each frequency bin having an equal intensity. It can be seen that around 18-19 kHz is a sweet spot for both avoiding noise and sending energy efficiently onto a robot. As such, this example chooses a frequency f of 19 kHz for a continuous sinusoidal signal s(t)=sin 2πft to excite the piezoelectric transmitter, and applies a narrow 19 kHz band-pass filter to a received signal for a further denoising. Note that 19 kHz is also inaudible for most adults.

Figure 9:
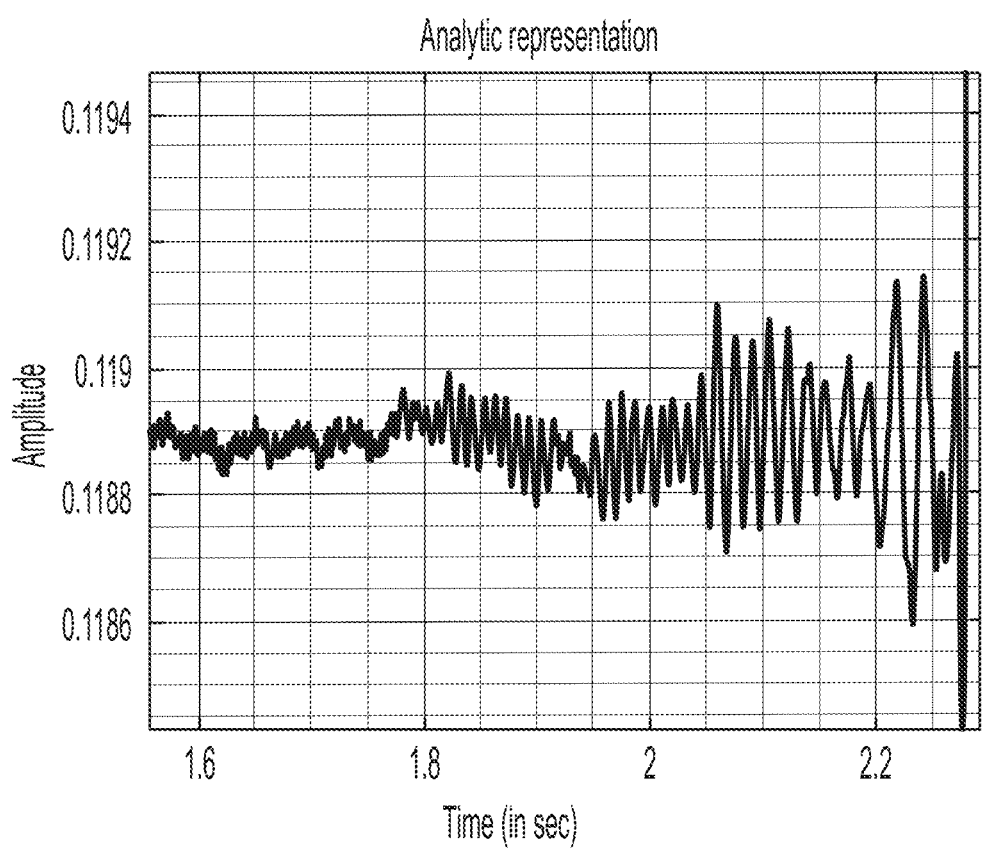
FIG. 9 is a graph illustrating an analytic representation for a moving object including an apparatus for robot collision avoidance by full surface proximity detection, according to embodiments.

FIG. 9 is a graph illustrating an analytic representation for a moving object including an apparatus for robot collision avoidance by full surface proximity detection, according to embodiments.

Notably, a received acoustic wave signal is orders of magnitude weaker than a surface guided signal, which can be seen from FIGS. 3A, 3B, and 7B. A large through surface signal will hinder a learning process if directly sent to a learning network.

Accordingly, after a received signal r(t) has been filtered by a band-pass filter, an analytic representation or a proximity signal can be calculated. Denoting x(t) as the filtered signal, an analytic signal $x_a(t)$ can be represented as:

$$x_a(t) \triangleq x(t)+jy(t) \quad (2),$$

where j is an imaginary unit. y(t) is the Hilbert transform of x(t), which is a convolution of x(t) with the Hilbert transform kernel $$h(t) \triangleq \frac{1}{\pi t}.$$

As a result, the analytic representation is a linear time-invariant filter process that can be written as:

$$x_a(t) = \frac{1}{\pi}\int_0^\infty X(\omega)e^{j\omega t}d\omega, \quad (3)$$

where X(ω) is the Fourier transform of the filtered signal x(t). This process may be applied every L sample.

FIG. 9 shows the analytic signal of the received signal from FIG. 7B with L equaling 300 samples (a sampling rate is 96 kHz). It can be seen that a proximity pattern is represented more clearly in the analytic signal.

Figure 10A:
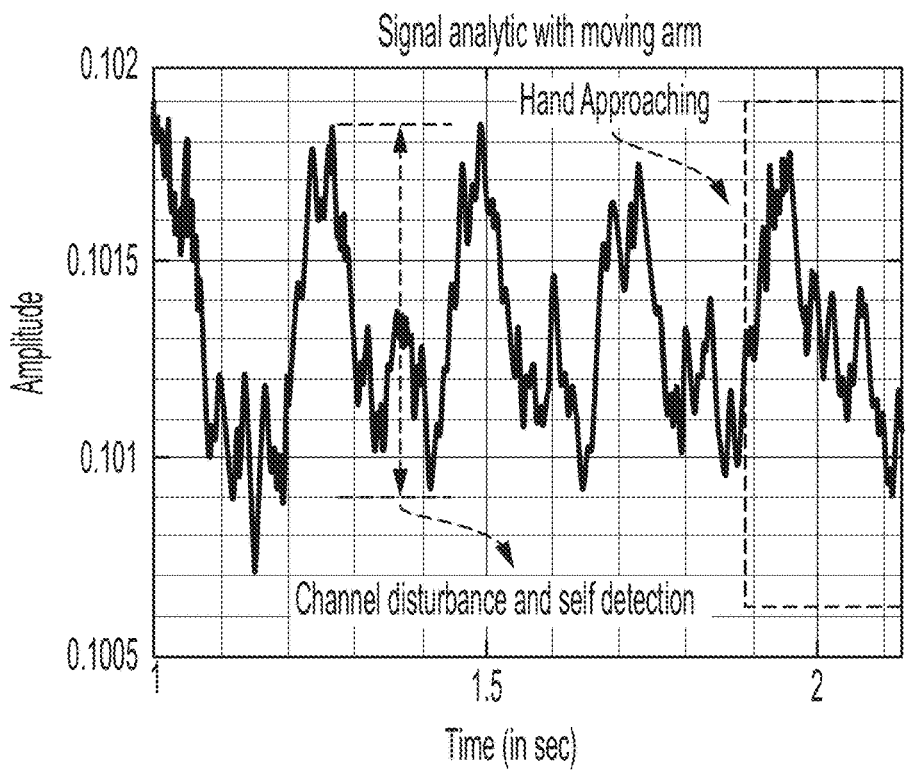
FIG. 10A is a graph illustrating an analytic signal for a moving object including an apparatus for robot collision avoidance by full surface proximity detection, according to embodiments.
Figure 10B:
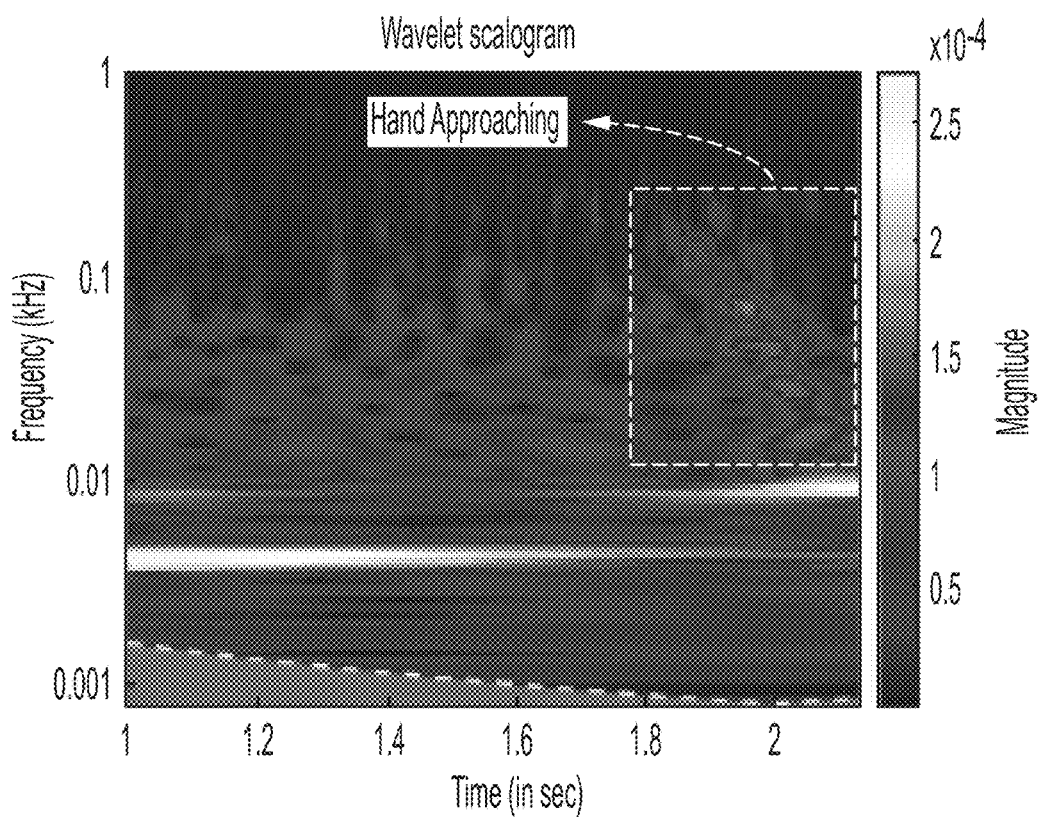
FIG. 10B is a scalogram illustrating the analytic signal of FIG. 10A.

FIG. 10A is a graph illustrating an analytic signal for a moving object including an apparatus for robot collision avoidance by full surface proximity detection, according to embodiments. FIG. 10B is a scalogram illustrating the analytic signal of FIG. 10A.

A wireless channel h in Equation (1) is mainly determined by mechanical characteristics of a moving object, e.g., a pose of a robot and an arm internal gear structure. Therefore, when an arm of the robot is moving, the wireless channel h is changing and alters a received acoustic wave signal r(t) as well as its analytic representation $x_a(t)$. On another hand, the robot arm could detect itself as an "obstacle" as linkages move closer to each other.

FIG. 10A shows a snapshot of an analytic signal with a robot arm moving. Note there is also a hand approaching at 1.8-2.2 seconds, but a proximity signal can be barely seen. However, proximity information does not get lost.

FIG. 10B shows a scalogram of this analytic signal, using wavelet analysis. It shows strong channel disturbance and self-detection signal. But a proximity signal is still visible at 1.8-2.2 seconds.

While addressing issues in preceding sections allows LSW signals to be detected reliably, using them for proximity detection is not straightforward, as several factors remain. A signal is heavily affected by robot arm movement, unfilterable background noise, and nature, position, and velocity of obstacles. These factors can have highly nonlinear effects on a signal amplitude or timescale, which make discriminating signals typical of approaching obstacles from a baseline case difficult.

Learning Proximity

To address these issues, embodiments use a one-dimensional (1D) convolutional neural network (CNN) to perform binary classification on a windowed analytic signal, classifying each segment as corresponding to an approaching obstacle or to a negative case in which no hazardous obstacles are close by. The CNN uses a fully-convolutional architecture, and consists of seven (7) 1D convolutions plus a linear output layer outputting a binary prediction (object approaching or not). This classifier takes as input windows of a fixed 960 samples collected at a 96 kHz sample rate, such that each window corresponds to 0.01 seconds of audio. Each input analytic signal window is normalized to have 0 mean and unit variance independently to remove differences in scale between audio samples.

Detector

While this classifier achieves high accuracy on 0.01 second timescales, for robust detection at human timescales, aggregation across multiple 0.01 second windows is needed. To make a final decision, embodiments pass N sequential 0.01-second window predictions into a larger window detector, and make the final determination of whether an approaching obstacle is detected or not by a majority vote among predictions in that larger window. The classifier's predictions may not be independent and identically distributed among windows. N may be chosen to optimize final detector performance.

Figure 11:
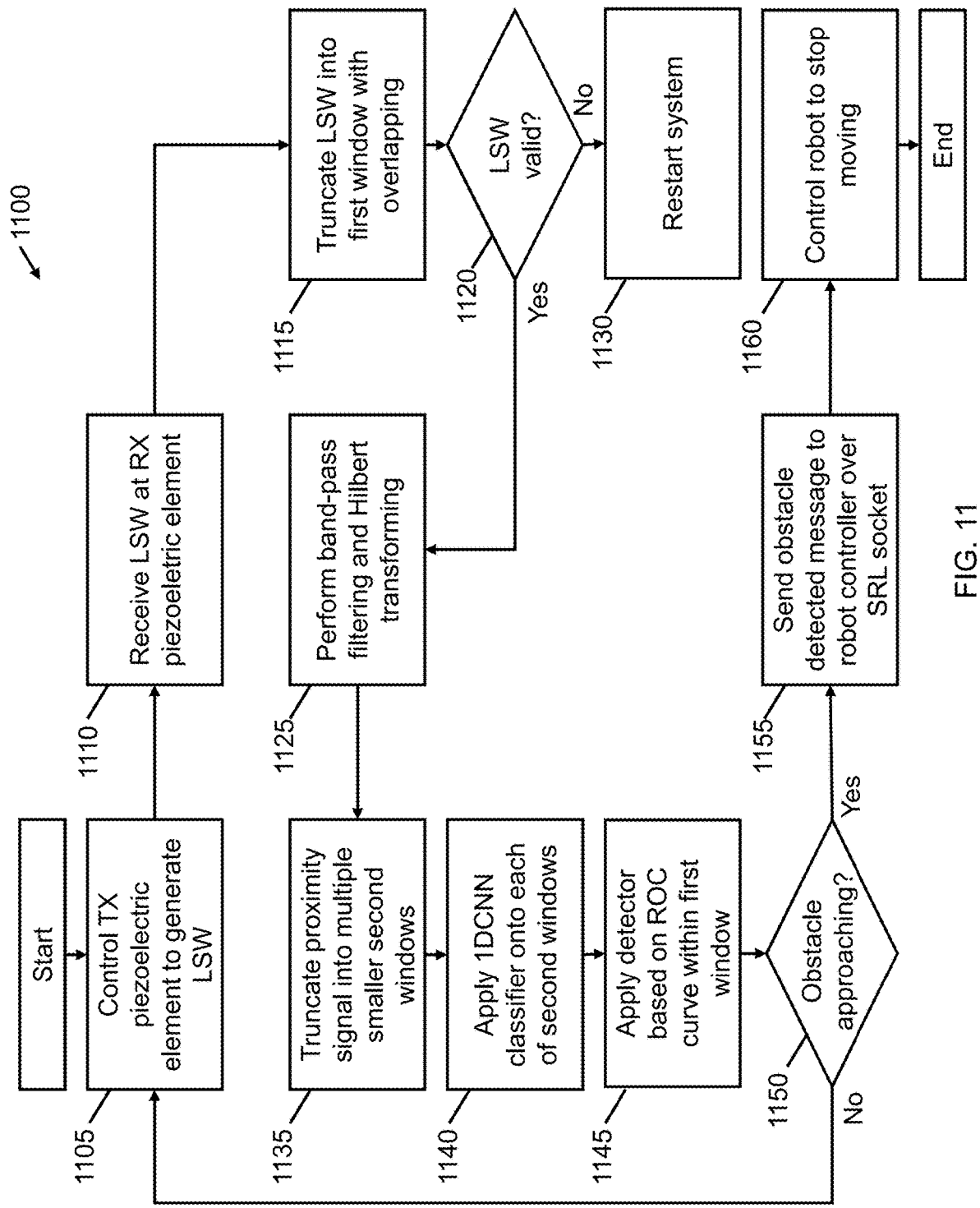
FIG. 11 is a flowchart of a method of robot collision avoidance by full surface proximity detection, according to embodiments.

FIG. 11 is a flowchart of a method 1100 of robot collision avoidance by full surface proximity detection, according to embodiments.

The method 1100 may be performed by at least one processor using the apparatus 100 of FIGS. 1A and 1B.

As shown in FIG. 11, in operation 1105, the method 1100 includes controlling a transmission (TX) piezoelectric element included in an object (e.g., a robot arm) to generate an LSW adjacent to a surface of the object.

In operation 1110, the method 1100 includes receiving the LSW at a reception (RX) piezoelectric element included in the object.

In operation 1115, the method 1100 includes truncating the LSW into a first window (e.g., 0.3 seconds) with overlapping.

In operation 1120, the method 1100 includes determining whether the LSW is valid. Based on the LSW being determined to be valid, the method 1100 continues in operation 1125. Otherwise, the method 1100 continues in operation 1130, in which a system is restarted.

In operation 1125, the method 1100 includes performing band-pass filtering and Hilbert transforming on the LSW to generate an analytic or proximity signal.

In operation 1135, the method 1100 includes truncating the proximity signal into multiple smaller second windows (e.g., 0.01 seconds).

In operation 1140, the method 1100 includes applying, to the proximity signal, a 1DCNN classifier onto each of the second windows.

In operation 1145, the method 1100 includes applying, to a result of the 1DCNN classifier being applied to the proximity signal, a detector based on a receiver operating characteristic (ROC) curve within the first window.

In operation 1150, the method 1100 determines whether an obstacle is approaching the object, based on a result of the detector being applied to the result of the 1DCNN classifier being applied to the proximity signal. Based on the obstacle being determined to approach the object, the method 1100 continues in operation 1155. Otherwise, the method 1100 returns to operation 1105.

In operation 1155, the method 1100 includes sending an obstacle detected message to a robot controller over a secure radio link (SRL) socket.

In operation 1160 the method 1100 includes controlling the robot controller to control the object to stop moving.

Figure 12:
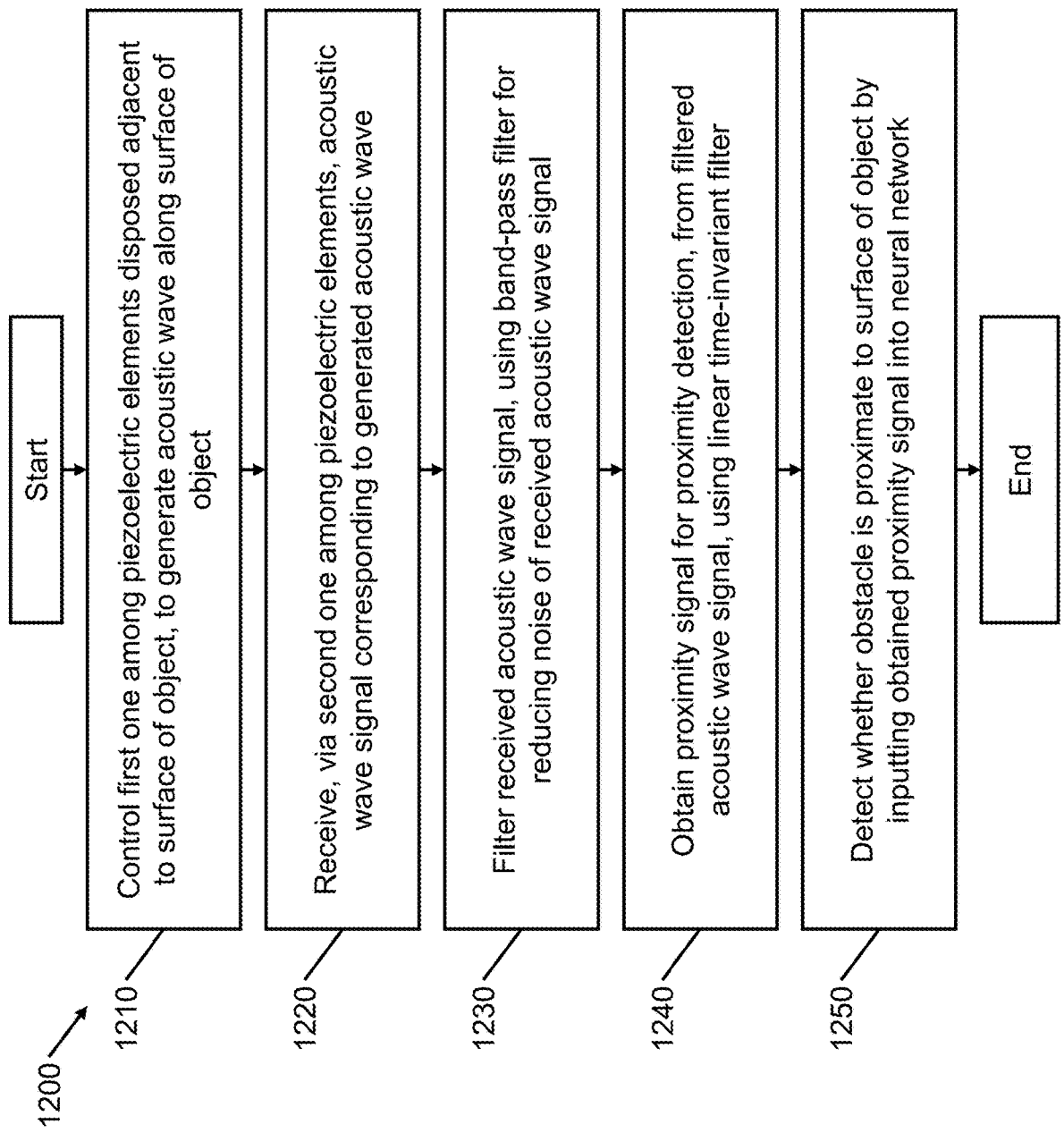
FIG. 12 is a flowchart of a method of collision avoidance by full surface proximity detection, according to embodiments.

FIG. 12 is a flowchart of a method 1200 of fast motion understanding, according to embodiments.

The method 1200 may be performed by at least one processor using the apparatus 100 of FIGS. 1A and 1B.

As shown in FIG. 12, in operation 1210, the method 1200 includes controlling a first one among piezoelectric elements disposed adjacent to a surface of an object, to generate an acoustic wave along the surface of the object.

In operation 1220, the method 1200 includes receiving, via a second one among the piezoelectric elements, an acoustic wave signal corresponding to the generated acoustic wave.

In operation 1230, the method 1200 includes filtering the received acoustic wave signal, using a band-pass filter for reducing noise of the received acoustic wave signal.

In operation 1240, the method 1200 includes obtaining a proximity signal for proximity detection, from the filtered acoustic wave signal, using a linear time-invariant filter.

In operation 1250, the method 1200 includes detecting whether an obstacle is proximate to the surface of the object by inputting the obtained proximity signal into a neural network.

The object may be a robot, and the method 1200 may further include, based on the obstacle being detected to be proximate to the surface of the object, control the object to avoid collision with the obstacle.

The band-pass filter may be for reducing electrical noise of a power supply of the robot and a mechanical noise of a motor of the robot, from the received acoustic wave signal.

The linear time-invariant filter may include any one or any combination of a Hilbert transform and a Fourier transform of the filtered acoustic wave signal.

The method 1200 may further include truncating the received acoustic wave signal into a window. The filtering may include filtering the truncated acoustic wave signal, using the band-pass filter.

The method 1200 may further include truncating the obtained proximity signal into a plurality of windows. The detecting may include detecting whether the obstacle is proximate to the surface of the object by inputting the truncated proximity signal into the neural network.

The method 1200 may further include truncating the obtained proximity signal into a plurality of windows, and inputting the truncated proximity signal into the neural network to obtain a plurality of predictions of whether the obstacle is proximate to the surface of the object. The detecting may include detecting whether the obstacle is proximate to the surface of the object, based on a majority vote among the obtained plurality of predictions.

Figure 13:
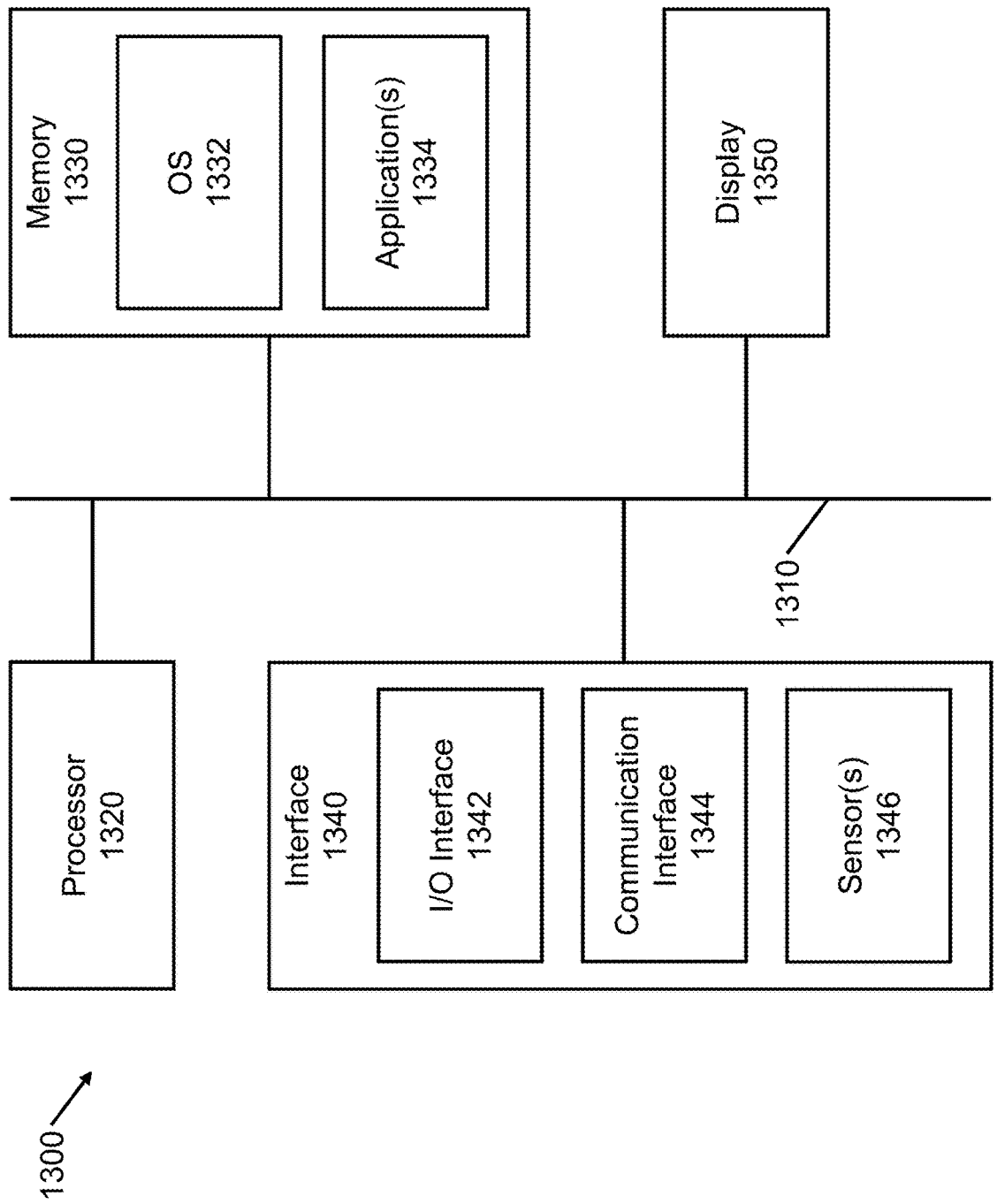
FIG. 13 is a block diagram of an electronic device in which the apparatus of FIGS. 1A and 1B is implemented, according to embodiments.

FIG. 13 is a block diagram of an electronic device 1300 in which the apparatus 100 of FIGS. 1A and 1B is implemented, according to embodiments.

FIG. 13 is for illustration only, and other embodiments of the electronic device 1300 could be used without departing from the scope of this disclosure.

The electronic device 1300 includes a bus 1310, a processor 1320, a memory 1330, an interface 1340, and a display 1350.

The bus 1310 includes a circuit for connecting the components 1320 to 1350 with one another. The bus 1310 functions as a communication system for transferring data between the components 1320 to 1350 or between electronic devices.

The processor 1320 includes one or more of a central processing unit (CPU), a graphics processor unit (GPU), an accelerated processing unit (APU), a many integrated core (MIC), a field-programmable gate array (FPGA), or a digital signal processor (DSP). The processor 1320 is able to perform control of any one or any combination of the other components of the electronic device 1300, and/or perform an operation or data processing relating to communication. The processor 1320 executes one or more programs stored in the memory 1330.

The memory 1330 may include a volatile and/or non-volatile memory. The memory 1330 stores information, such as one or more of commands, data, programs (one or more instructions), applications 1334, etc., which are related to at least one other component of the electronic device 1300 and for driving and controlling the electronic device 1300. For example, commands and/or data may formulate an operating system (OS) 1332. Information stored in the memory 1330 may be executed by the processor 1320.

The applications 1334 include the above-discussed embodiments. These functions can be performed by a single application or by multiple applications that each carry out one or more of these functions.

The display 1350 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 1350 can also be a depth-aware display, such as a multi-focal display. The display 1350 is able to present, for example, various contents, such as text, images, videos, icons, and symbols.

The interface 1340 includes input/output (I/O) interface 1342, communication interface 1344, and/or one or more sensors 1346. The I/O interface 1342 serves as an interface that can, for example, transfer commands and/or data between a user and/or other external devices and other component(s) of the electronic device 1300.

The sensor(s) 1346 can meter a physical quantity or detect an activation state of the electronic device 1300 and convert metered or detected information into an electrical signal. For example, the sensor(s) 1346 can include one or more cameras or other imaging sensors for capturing images of scenes. The sensor(s) 1346 can also include any one or any combination of a microphone, a keyboard, a mouse, one or more buttons for touch input, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, and a fingerprint sensor. The sensor(s) 1346 can further include an inertial measurement unit. In addition, the sensor(s) 1346 can include a control circuit for controlling at least one of the sensors included herein. Any of these sensor(s) 1346 can be located within or coupled to the electronic device 1300. The sensors 1346 may be used to detect touch input, gesture input, and hovering input, using an electronic pen or a body portion of a user, etc.

The communication interface 1344, for example, is able to set up communication between the electronic device 1300 and an external electronic device. The communication interface 1344 can be a wired or wireless transceiver or any other component for transmitting and receiving signals.

The embodiments of the disclosure described above may be written as computer executable programs or instructions that may be stored in a medium.

The medium may continuously store the computer-executable programs or instructions, or temporarily store the computer-executable programs or instructions for execution or downloading. Also, the medium may be any one of various recording media or storage media in which a single piece or plurality of pieces of hardware are combined, and the medium is not limited to a medium directly connected to the electronic device 1300, but may be distributed on a network. Examples of the medium include magnetic media, such as a hard disk, a floppy disk, and a magnetic tape, optical recording media, such as CD-ROM and DVD, magneto-optical media such as a floptical disk, and ROM, RAM, and a flash memory, which are configured to store program instructions. Other examples of the medium include recording media and storage media managed by application stores distributing applications or by websites, servers, and the like supplying or distributing other various types of software.

The above described method may be provided in a form of downloadable software. A computer program product may include a product (for example, a downloadable application) in a form of a software program electronically distributed through a manufacturer or an electronic market. For electronic distribution, at least a part of the software program may be stored in a storage medium or may be temporarily generated. In this case, the storage medium may be a server or a storage medium of the server.

A model related to the CNN described above may be implemented via a software module. When the CNN model is implemented via a software module (for example, a program module including instructions), the CNN model may be stored in a computer-readable recording medium.

Also, the CNN model may be a part of the apparatus 100 described above by being integrated in a form of a hardware chip. For example, the CNN model may be manufactured in a form of a dedicated hardware chip for artificial intelligence, or may be manufactured as a part of an existing general-purpose processor (for example, a CPU or application processor) or a graphic-dedicated processor (for example a GPU).

Also, the CNN model may be provided in a form of downloadable software. A computer program product may include a product (for example, a downloadable application) in a form of a software program electronically distributed through a manufacturer or an electronic market. For electronic distribution, at least a part of the software program may be stored in a storage medium or may be temporarily generated. In this case, the storage medium may be a server of the manufacturer or electronic market, or a storage medium of a relay server.

The above-described embodiments may provide a sensing modality, a LSW, which turns an entire robot surface into tactile skin that senses no-dead-spot proximity on a robot arm. The embodiments realize whole surface collision avoidance on a robot linkage. Several signal processing algorithms, hardware tweaks, and a lightweight 1DCNN algorithm address challenges in using an LSW signal. The embodiments may realize close to 100% on-robot proximity detection true positive rate in approaching scenarios and close to 0% false positive rate in scenarios in which nothing approaches the robot arm.

While the embodiments of the disclosure have been described with reference to the figures, it will be understood by those of ordinary skill in the art that various changes in form and details may be made therein without departing from the spirit and scope as defined by the following claims.

What is claimed is:

1. An apparatus for collision avoidance by surface proximity detection of an obstacle relative to an object, the apparatus comprising:
   a plurality of piezoelectric elements attached to a surface of the object;
   a memory storing instructions; and
   at least one processor configured to execute the instructions to:
      control a first one among the piezoelectric elements to generate an acoustic wave along the surface of the object;
      receive, via a second one among the piezoelectric elements, an acoustic wave signal corresponding to an acoustic impedance change in an acoustic pressure field perturbed by a standing wave pattern or interference pattern established by the obstacle;
      reduce noise of the received acoustic wave signal by filtering, using a band-pass filter, the received acoustic wave signal;
      obtain a proximity signal for proximity detection, from the filtered acoustic wave signal, using a linear time-invariant filter; and
      detect whether the obstacle is adjacent to the surface of the object by inputting the obtained proximity signal into a neural network.

2. The apparatus of claim 1, wherein the object is a robot, and
   the at least one processor is further configured to execute the instructions to, based on the obstacle being detected to be adjacent to the surface of the object, control the object to avoid collision with the obstacle.

3. The apparatus of claim 2, wherein the noise comprises electrical noise of a power supply of the robot and mechanical noise of a motor of the robot.

4. The apparatus of claim 1, wherein the linear time-invariant filter comprises any one or any combination of a Hilbert transform and a Fourier transform of the filtered acoustic wave signal.

5. The apparatus of claim 1, wherein the at least one processor is further configured to execute the instructions to:
   truncate the received acoustic wave signal into a window; and
   filter the truncated acoustic wave signal, using the band-pass filter.

6. The apparatus of claim 1, wherein the at least one processor is further configured to execute the instructions to:
   truncate the obtained proximity signal into a plurality of windows; and
   detect whether the obstacle is adjacent to the surface of the object by inputting the truncated proximity signal into the neural network.

7. The apparatus of claim 1, wherein the at least one processor is further configured to execute the instructions to:
   truncate the obtained proximity signal into a plurality of windows;
   input the truncated proximity signal into the neural network to obtain a plurality of predictions of whether the obstacle is adjacent to the surface of the object; and
   detect whether the obstacle is adjacent to the surface of the object, based on a majority vote among the obtained plurality of predictions.

8. A method of collision avoidance by surface proximity detection of an obstacle relative to an object, the method being performed by at least one processor, and the method comprising:
   controlling a first one among piezoelectric elements attached to a surface of the object, to generate an acoustic wave along the surface of the object;
   receiving, via a second one among the piezoelectric elements, an acoustic wave signal corresponding to an acoustic impedance change in an acoustic pressure field perturbed by a standing wave pattern or interference pattern established by the obstacle;
   reducing noise of the received acoustic wave signal by filtering, using a band-pass filter, the received acoustic wave signal;
   obtaining a proximity signal for proximity detection, from the filtered acoustic wave signal, using a linear time-invariant filter; and
   detecting whether the obstacle is adjacent to the surface of the object by inputting the obtained proximity signal into a neural network.

9. The method of claim 8, wherein the object is a robot, and
   the method further comprises, based on the obstacle being detected to be adjacent to the surface of the object, control the object to avoid collision with the obstacle.

10. The method of claim 9, wherein the noise comprises electrical noise of a power supply of the robot and mechanical noise of a motor of the robot, from the received acoustic wave signal.

11. The method of claim 8, wherein the linear time-invariant filter comprises any one or any combination of a Hilbert transform and a Fourier transform of the filtered acoustic wave signal.

12. The method of claim 8, further comprising truncating the received acoustic wave signal into a window,
   wherein the filtering comprises filtering the truncated acoustic wave signal, using the band-pass filter.

13. The method of claim 8, further comprising truncating the obtained proximity signal into a plurality of windows, wherein the detecting comprises detecting whether the obstacle is adjacent to the surface of the object by inputting the truncated proximity signal into the neural network.

14. The method of claim 8, further comprising:
truncating the obtained proximity signal into a plurality of windows; and
inputting the truncated proximity signal into the neural network to obtain a plurality of predictions of whether the obstacle is adjacent to the surface of the object,
wherein the detecting comprises detecting whether the obstacle is adjacent to the surface of the object, based on a majority vote among the obtained plurality of predictions.

15. A non-transitory computer-readable storage medium storing instructions that, when executed by at least one processor, cause the at least one processor to:
control a first one among piezoelectric elements attached to a surface of an object, to generate an acoustic wave along the surface of the object;
receive, via a second one among the piezoelectric elements, an acoustic wave signal corresponding to an acoustic impedance change in an acoustic pressure field perturbed by a standing wave pattern or interference pattern established by an obstacle;
reduce noise of the received acoustic wave signal by filtering, by using a band-pass filter, the received acoustic wave signal;
obtain a proximity signal for proximity detection, from the filtered acoustic wave signal, using a linear time-invariant filter; and
detect whether an obstacle is adjacent to the surface of the object by inputting the obtained proximity signal into a neural network.

16. The non-transitory computer-readable storage medium of claim 15, wherein the object is a robot,
wherein the instructions, when executed by the at least one processor, further cause the at least one processor to, based on the obstacle being detected to be adjacent to the surface of the object, control the object to avoid collision with the obstacle, and
wherein the noise comprises electrical noise of a power supply of the robot and mechanical noise of a motor of the robot.

17. The non-transitory computer-readable storage medium of claim 15, wherein the linear time-invariant filter comprises any one or any combination of a Hilbert transform and a Fourier transform of the filtered acoustic wave signal.

18. The non-transitory computer-readable storage medium of claim 15, wherein the instructions, when executed by the at least one processor, further cause the at least one processor to:
truncate the received acoustic wave signal into a window; and
filter the truncated acoustic wave signal, using the band-pass filter.

19. The non-transitory computer-readable storage medium of claim 15, wherein the instructions, when executed by the at least one processor, further cause the at least one processor to:
truncate the obtained proximity signal into a plurality of windows; and
detect whether the obstacle is adjacent to the surface of the object by inputting the truncated proximity signal into the neural network.

20. The non-transitory computer-readable storage medium of claim 15, wherein the instructions, when executed by the at least one processor, further cause the at least one processor to:
truncate the obtained proximity signal into a plurality of windows;
input the truncated proximity signal into the neural network to obtain a plurality of predictions of whether the obstacle is adjacent to the surface of the object; and
detect whether the obstacle is adjacent to the surface of the object, based on a majority vote among the obtained plurality of predictions.

* * * * *